Aug. 15, 1944.  O. D. PREMO  2,355,750

SHAFT MILLING AND GRINDING MACHINE

Original Filed Nov. 13, 1940   5 Sheets-Sheet 1

Owen D. Premo INVENTOR.

BY

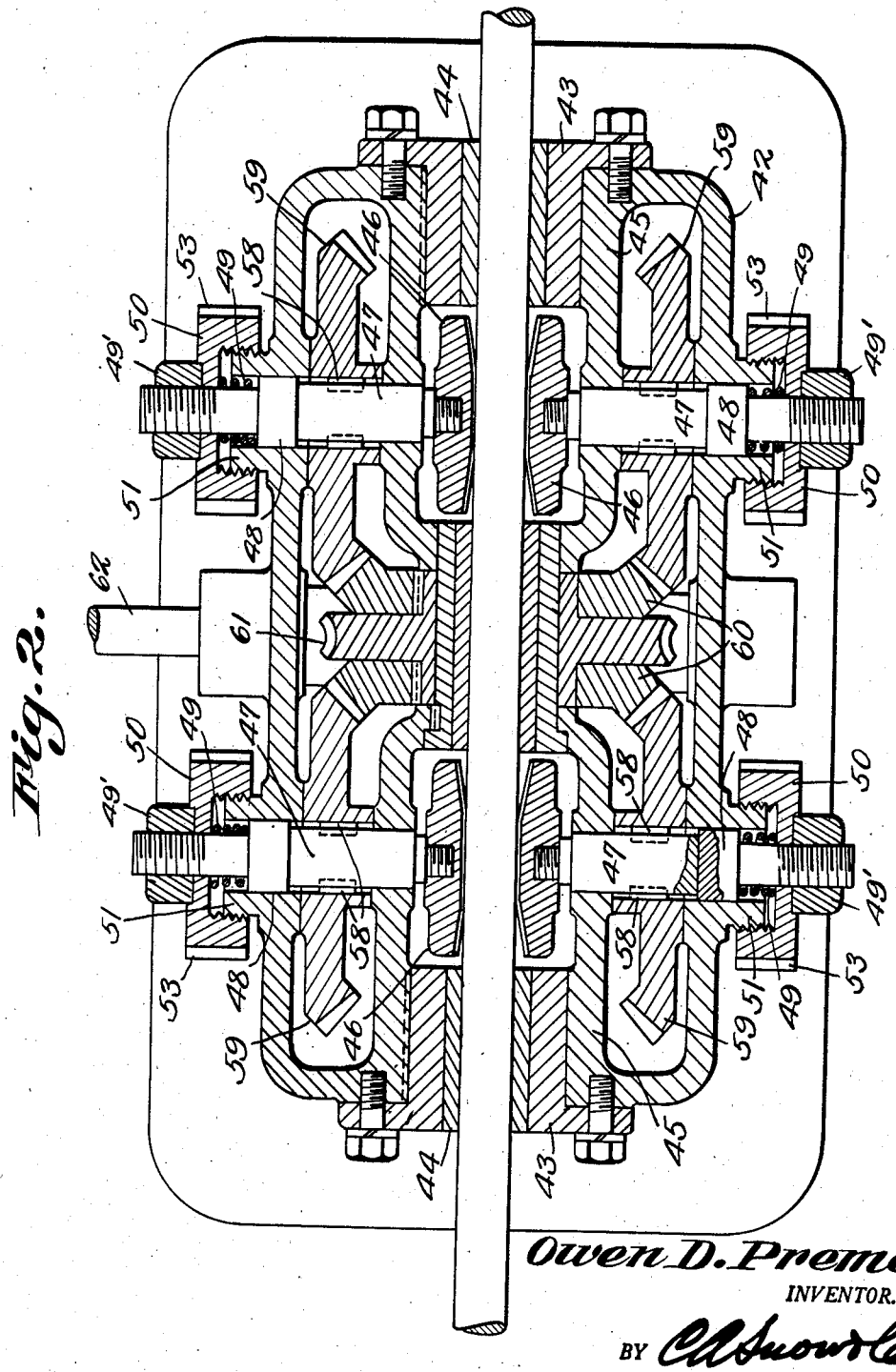

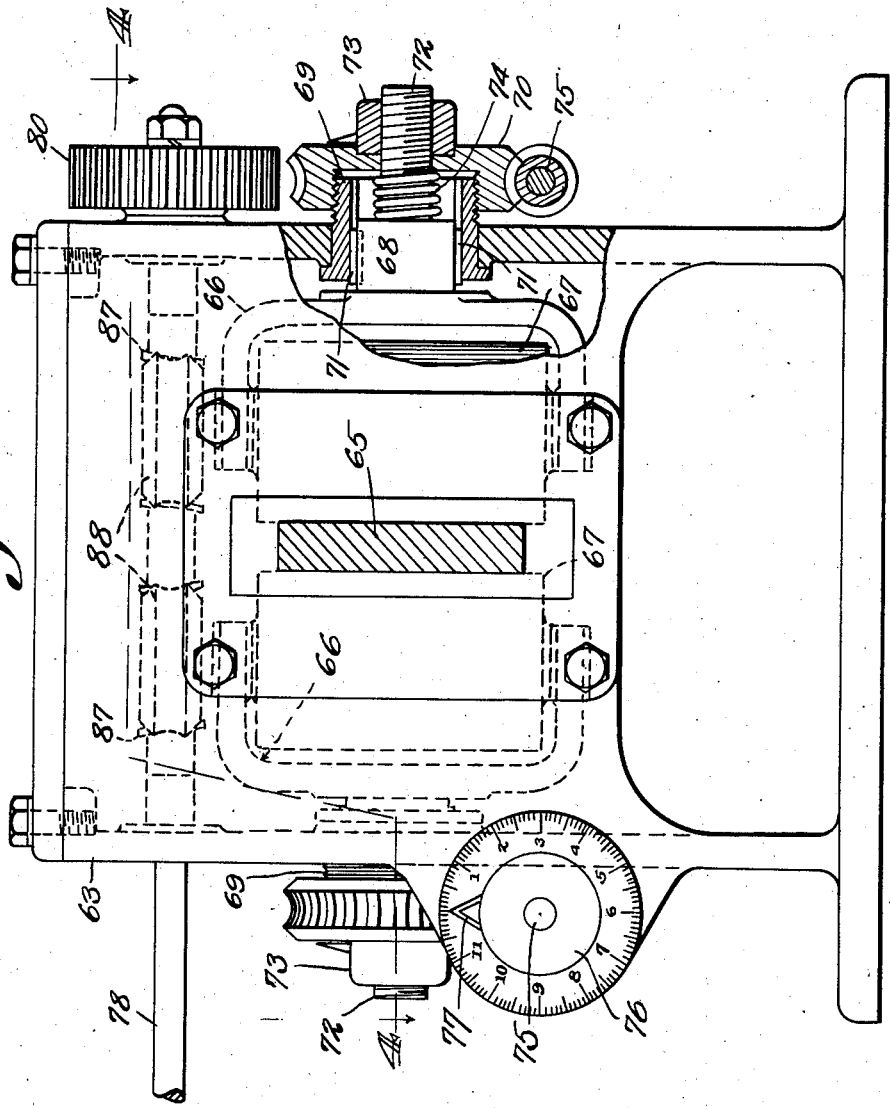

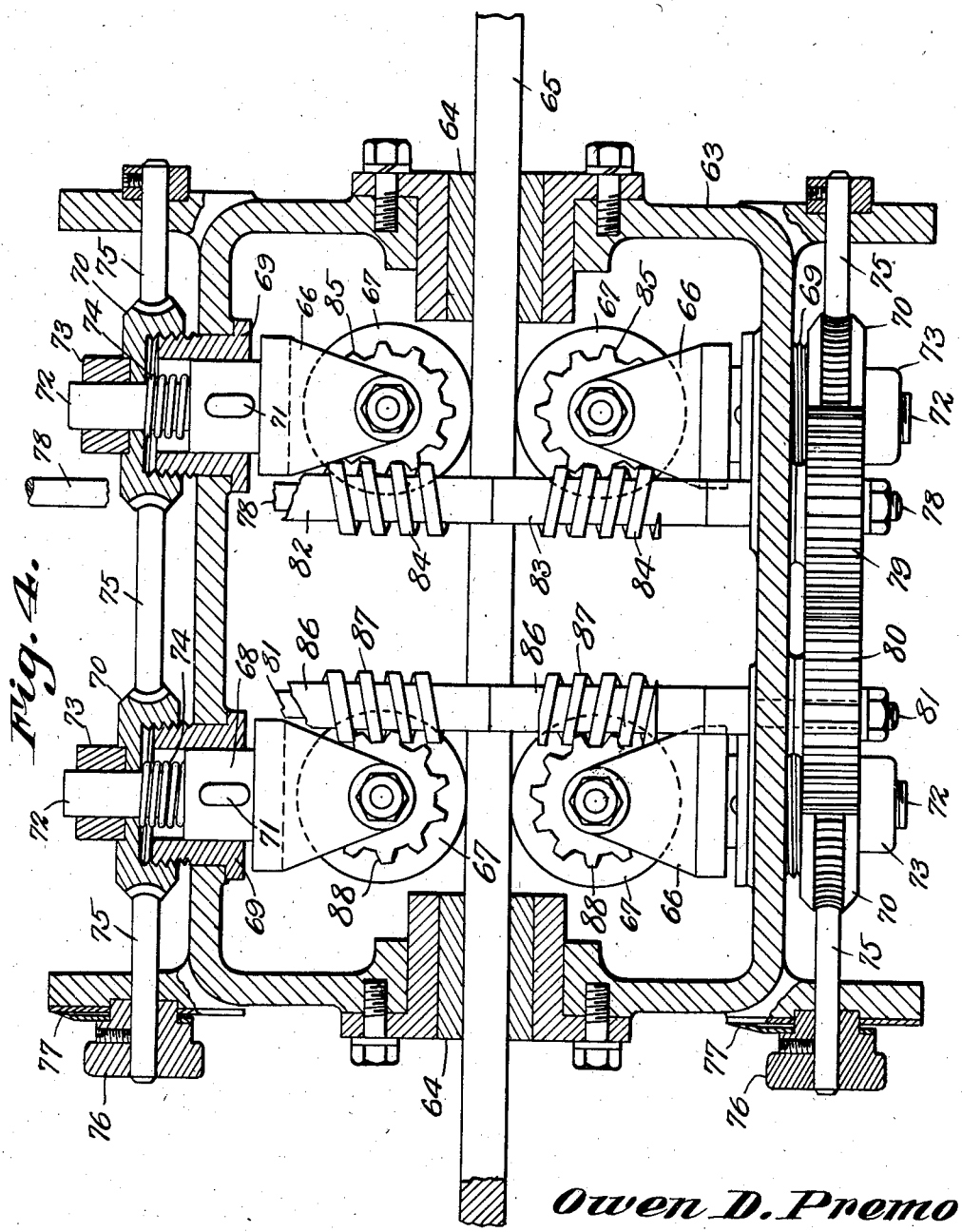

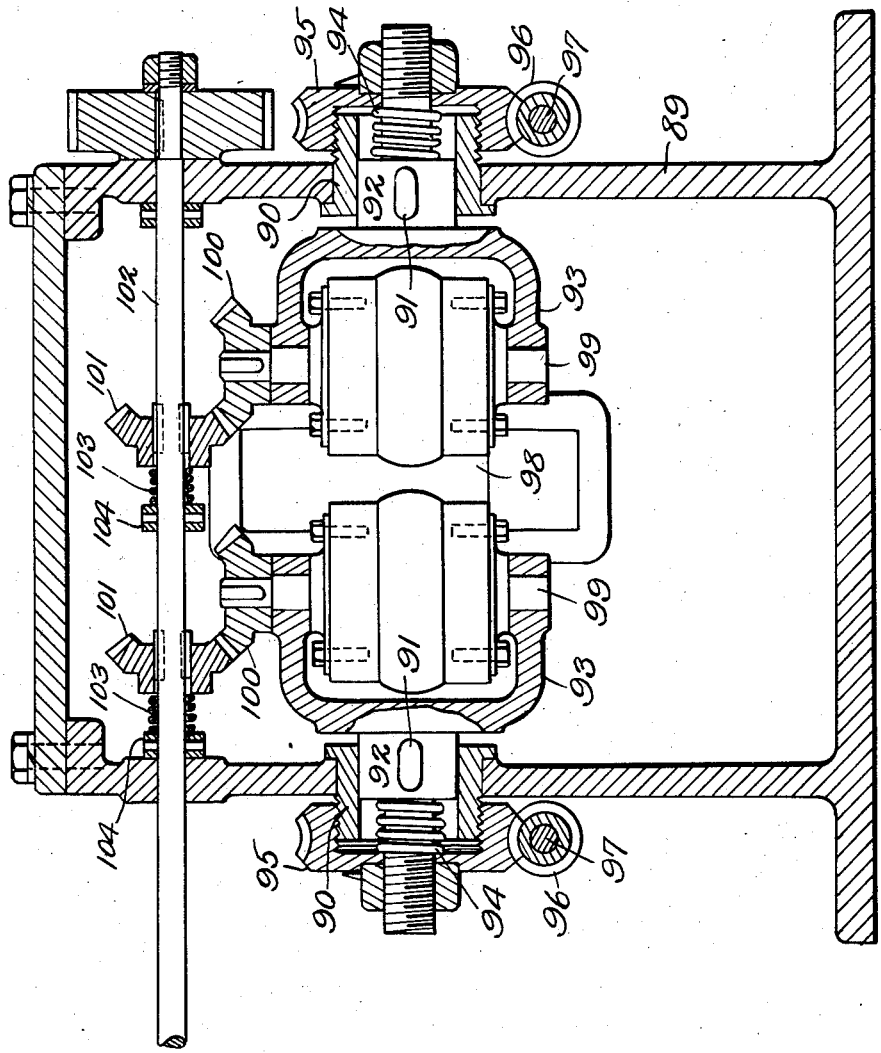

Patented Aug. 15, 1944

2,355,750

UNITED STATES PATENT OFFICE 2,355,750

SHAFT MILLING AND GRINDING MACHINE

Owen D. Premo, Muskegon Heights, Mich.

Original application November 13, 1940, Serial No. 365,535. Divided and this application October 17, 1941, Serial No. 415,463

2 Claims. (Cl. 51—112)

This invention relates to a shaft milling and grinding machine and is a division of my copending application filed November 13, 1940, Serial No. 365,535 the primary object of the invention is to provide a machine of this character which may be used as an attachment for lathes, traveling head planers, draw-cut shapers having internal arbors, boring mills or the like.

An important object of the invention is to provide a machine of this character wherein the milling or grinding heads thereof may be readily adjusted with respect to each other, adapting the heads for use in accurately milling or grinding various types of curved surfaces.

Another important object of the invention is to provide a machine of this character including a special arrangement of gearing which will cause the cutter to rotate in a direction to equalize the cutting forces.

Still another object of the invention is to provide a machine which may be used in accurately forming molding from metal or wooden bar stock.

With the foregoing and other objects in view, which will appear as the description proceeds, the invention resides in the combination and arrangement of parts and in the details of construction hereinafter described and claimed, it being understood that changes in the precise embodiment of the invention herein described, may be made within the scope of what is claimed, without departing from the spirit of the invention.

Referring to the drawings:

Figure 2 is a sectional view taken on line 2—2 of Figure 1.

Figure 3 is an end elevational view of a still further modified form of the invention wherein the machine is used for milling or grinding the flat surfaces of rectangular objects.

Figure 4 is a sectional view taken on line 4—4 of Figure 3.

Figure 5 is another modified form of the invention, illustrating curved grinding and cutting members used in forming molding or similar curved surfaces on bar stock.

Figure 1:
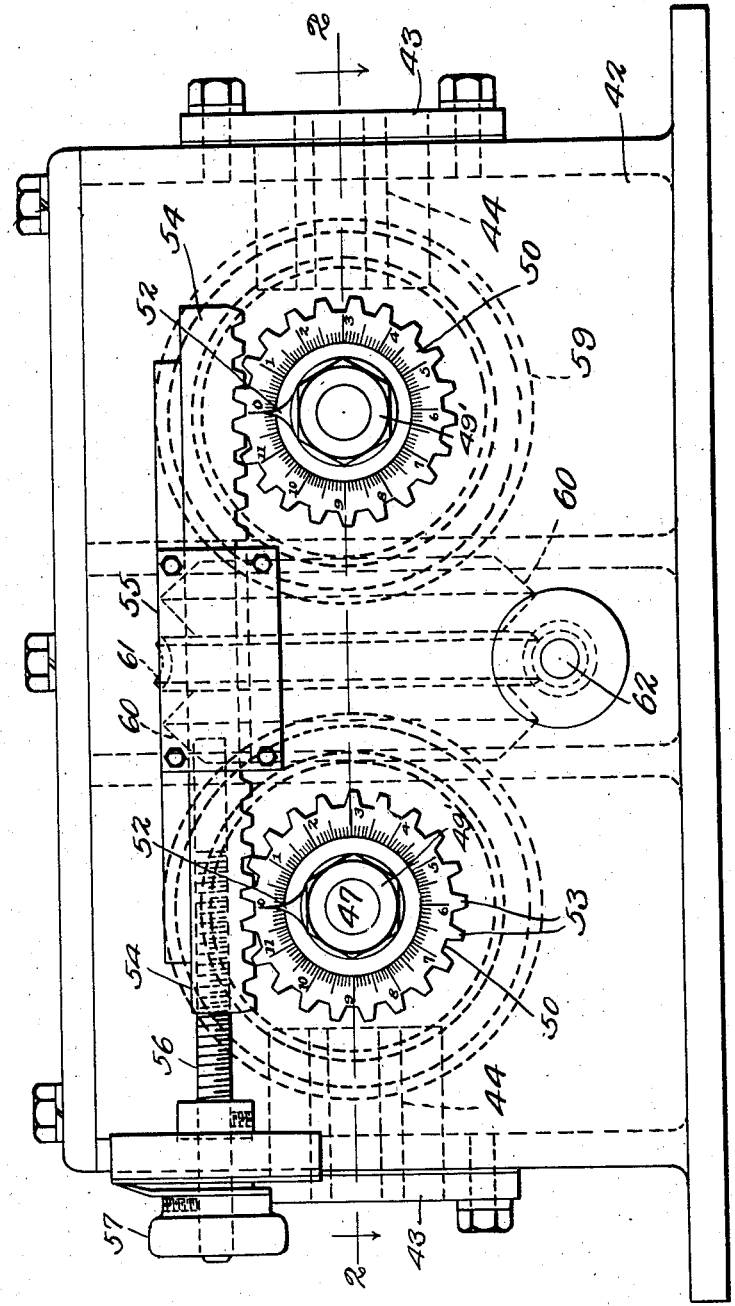
Figure 1 is a side elevational view illustrating a modified form of the invention.

The body portion of the device, which is indicated by the reference character 42 is box-like in formation, and is provided with openings in the ends thereof for the reception of the bushing supports 43, in which the bushings 44 are mounted. These bushings 44 are of a removable character, to suit the shape of work to guide the work through the machine.

The body portion is formed with an integral wall 45 providing a housing for the cutters 46 that are mounted on the inner ends of the shafts 47 that have their outer end extended into openings formed in the walls of the body portion. Pairs of shafts 48' are also positioned in the openings formed in the walls of the body portion, and are provided with thrust bearings 48 at their inner ends that engage the outer ends of the shafts 47, as clearly shown by Figure 2 of the drawings. The bearings 48 provide stops against which the coiled springs 49 engage. The outer ends of the coiled springs rest against the adjusting nuts 50 which are mounted on the annular flanges 51, and which are threaded to receive said adjusting nuts. As shown by Figure 2, sufficient clearance is provided between the adjusting nuts and the annular flanges 51, to permit of rotary movement of the adjusting nuts to exert pressure on the coiled springs, tensioning the springs to prevent rotation of the nuts, due to vibrations during the grinding operation. Nuts 49' are disposed on the threaded ends of the shafts 47 and act to further restrict rotation of the adjusting nuts 50. Suitable graduations are formed on the adjusting nuts 50, as shown by Figure 1 of the drawings, the graduations cooperating with the indicators 52, providing a micrometer adjustment for the cutters.

These adjusting nuts 50 are provided with teeth 53 that are engaged by the teeth of the rack bars 54, the rack bars being of lengths to operate the adjusting nuts on each side of the body portion, simultaneously. These rack bars 54 move through the guides 55 that are formed on opposite sides of the body portion. An adjusting screw 56 is associated with each rack bar, and is positioned in a threaded bore formed in one end of the rack bar, the adjusting screws being formed with finger pieces 57, whereby the adjusting screws and rack bars may be readily moved to rotate the adjusting screws to accomplish the purpose of the invention.

As will be clearly seen by an examination of Figure 2 of the drawings, the shafts 47 are arranged in pairs at opposite sides of the body portion, and these shafts 47 are formed with grooves to receive the keys 58 carried by the gear 59, to the end that the shafts 47 may slide with respect to the gears, but at the same time be rotated by rotary movement of the gears. The gears 59 are also arranged in pairs and engage gears 60 that are keyed to the main gear 61 rotated by the power shaft 62.

Since the gears 59, 60 and 61 are encased in the body portion, it will be seen that a single oil bath will serve to lubricate all of the gears of the machine.

In the modified form of the invention as illustrated by Figures 3 and 4 of the drawings, the machine has been especially constructed for use in milling or grinding bar material of rectangular formation.

In this form of the invention, the body portion of the machine is indicated by the reference character 63 and is formed with openings in which the bushings 64 are mounted, the bushings 64 being of a shape or formation to receive the bar under treatment, which in the present showing is indicated by the reference character 65.

The reference character 66 designates the tool supports, each of which embodies spaced arms between which the tools 67, are mounted, which in the present showing are in the form of grinding cylinders. Each tool support 66 is formed with an extension 68 fitted in a bushing 69, that in turn is positioned in an opening formed in the wall of the body portion. As shown, each of these bushings has a threaded extension for the reception of the nut 70, associated therewith.

Keys indicated at 71 are formed on the extensions 68 and move in guideways formed in the bushings 69, so that rotary movement of the tool supports will be prevented, but at the same time the tool supports will be permitted to slide longitudinally of the bushings, for purposes to be hereinafter more fully described.

Threaded shanks 72 are formed on the extensions 68, and pass through openings formed in the nuts 70, where they are supplied with nuts 73, to stop inward movement of tool support 66. Coiled springs indicated at 74 are disposed between the free ends of the extensions 68 and inner surfaces of the nuts 70, the action of the springs being to normally urge the tool supports 66, inwardly towards the work.

Teeth are formed in the peripheries of the nuts 70, which teeth are engaged by worms formed on the shafts 75 that are mounted in bearings at the sides of the body portion, the ends of the shafts adjacent to the forward end of the machine, being supplied with knobs 76 whereby the shafts 75 may be rotated to rotate the nuts 70. It will be seen that as the nuts 70 are rotated, the tension of the springs 74 will be regulated resulting in the adjustment of the tools. Graduations are formed adjacent to the knobs 76, and cooperate with the indicators 77 carried by the knobs, so that the shafts may be accurately rotated, predetermined degrees. The power shaft is indicated by the reference character 78 and is mounted in bearings formed in the side walls of the body portion, one end of the power shaft 78 being extended beyond one wall of the body portion, where it supports the gear 79 that meshes with the gear 80 carried on one end of the shaft 81, the gears 79 and 80 operating to rotate the shafts in opposite directions.

Mounted on the shaft 78, are sleeves 82 and 83, the sleeves being secured to the shafts to rotate therewith. These sleeves 82 and 83 are formed with worms 84 that mesh with the teeth of the gears 85 that are secured at the ends of the shafts on which the cutting tools operate, to rotate the cutting tools. The worms are pitched in opposite directions, so that rotary movement is imparted to the tools 67 to rotate the tools in opposite directions.

Sleeves 86 are secured to the shaft 81 and are provided with worms 87, the worms 87 meshing with the gears 88 secured to the shafts on which the tools 67 at the opposite side of the machine are mounted. These worms 87 are also oppositely pitched, so that the tools will be rotated in opposite directions.

Thus it will be seen that when the machine is set in motion and a bar to be treated is fed through the machine, the tools which are rapidly rotating over the side faces of the work, will accurately mill or grind the surfaces, to accomplish the purpose of the invention.

By operating the knobs 76, the tools may be adjusted with respect to each other to the end that a particular type of work may be accomplished.

It will also be noted that by adjusting the nuts 73, the tools may be adjusted independently of each other. A still further modified form of the invention is illustrated by Figure 5 of the drawings, the structure shown by Figure 5 being particularly designed for use in milling or forming moldings or the like.

The body portion of the machine is indicated by the reference character 89, and is provided with openings in the side walls thereof for the reception of the bushings 90, the bushings being formed with slots for the reception of the keys 91 formed on the extensions 92 of the tool supports 93. These tool supports 93 are substantially the same as shown in Figure 4 of the drawings, and are forced inwardly by means of the coiled springs 94 that bear against the outer ends of the extensions 92 and engage the adjusting nuts 95 that are rotated by means of the worms 96 formed on the shafts 97. The tools in this particular showing, are formed with irregular surfaces to form correspondingly shaped sides on the material passed through the machine.

The material, which may be in bar form, is fed between the tools, through the openings 98 formed in the sides of the body portion 89.

These tools are mounted on the shafts 99 that operate in bearings formed in the tool supports, as clearly shown by Figure 5.

On the extended ends of the shafts 99, are pinions 100 that mesh with the pinions 101 that are splined on the power shaft 102, the pinions 101 being urged towards the pinions 100, by the coiled springs 103, that are shown as bearing against the pinions 101, the opposite ends of the coiled springs engaging the stops 104 that are secured to the power shaft 102. Since the pinions 101 are splined on the power shaft 102, movement of the tools towards or away from the work, may be compensated for by the action of the coiled springs 103 which maintain the pinions 101 and 100 in mesh. It will also be noted that these pinions may be readily moved out of engagement with each other, should it be desired to change the tools for various types of work, thereby providing for ready interchanging of the tools.

In view of the foregoing detail disclosure it is believed that a further description as to the operation of the device is unnecessary.

What is claimed is:

1. A machine of the class described, comprising a body portion, a plurality of shafts extending into the body portion from opposite sides of the body portion, grinding tools mounted on the inner ends of said shafts and between which the work is fed, toothed nuts on the shafts, an adjusting screw mounted on each side of the body, a rack bar mounted on each side of the body and having a threaded bore, said threaded bores adapted to receive the adjusting screws, said rack bars adapted to engage the teeth of the nuts whereby the grinding tools at each side of the body portion may be adjusted towards and away from each other simultaneously, and means for rotating said grinding tools.

2. In a grinding machine of the class described, a body portion, pairs of shafts extending into the body portion from opposite sides thereof, grinding members mounted on the inner ends of the shafts, adjusting nuts at the outer ends of the shafts, said adjusting nuts having teeth formed in the peripheries thereof, a horizontal rack bar mounted at each side of the body, said rack bars being in mesh with the teeth of said adjusting nuts, said rack bars having longitudinally threaded bores extending inwardly from one of the ends thereof, said adjusting screws being disposed within the threaded bores and adapted to move the shafts of each pair of shafts simultaneously towards and away from the work.

OWEN D. PREMO.